United States Patent
Hooreman

[15] 3,683,069
[45] Aug. 8, 1972

[54] ENZYMATIC PRODUCTS WHICH OPTIMIZE THE VISCOSITY OF MUCUSES AND THEIR APPLICATIONS

[72] Inventor: Michel Hooreman, 9 rue Marbeau, Paris, France

[22] Filed: Feb. 19, 1970

[21] Appl. No.: 12,595

[30] Foreign Application Priority Data

Feb. 21, 1971   Great Britain............9,619/71

[52] U.S. Cl. ................................................424/94
[51] Int. Cl. ...........................................A61k 19/00
[58] Field of Search......................................424/94

[56] References Cited

UNITED STATES PATENTS

| | | | |
|---|---|---|---|
| 2,878,123 | 3/1959 | Beuk et al | 424/94 |
| 2,906,621 | 9/1959 | Catron | 424/94 |
| 2,988,448 | 6/1961 | Hollenbeck | 424/94 |

*Primary Examiner*—Richard L. Huff
*Attorney*—Miketta, Glenny, Poms & Smith

[57] ABSTRACT

The invention provides proteolytic enzyme-containing compositions which, on administration, optimize the in vivo viscosity of the mucuses and which are characterized by bringing the magnitude of the in vitro viscosity to a value generally between those values obtained when mucus is subjected to identical treatments with trypsin and chymotrypsin; they are also characterized by being insensitive to trypsin inhibitors.

3 Claims, 1 Drawing Figure

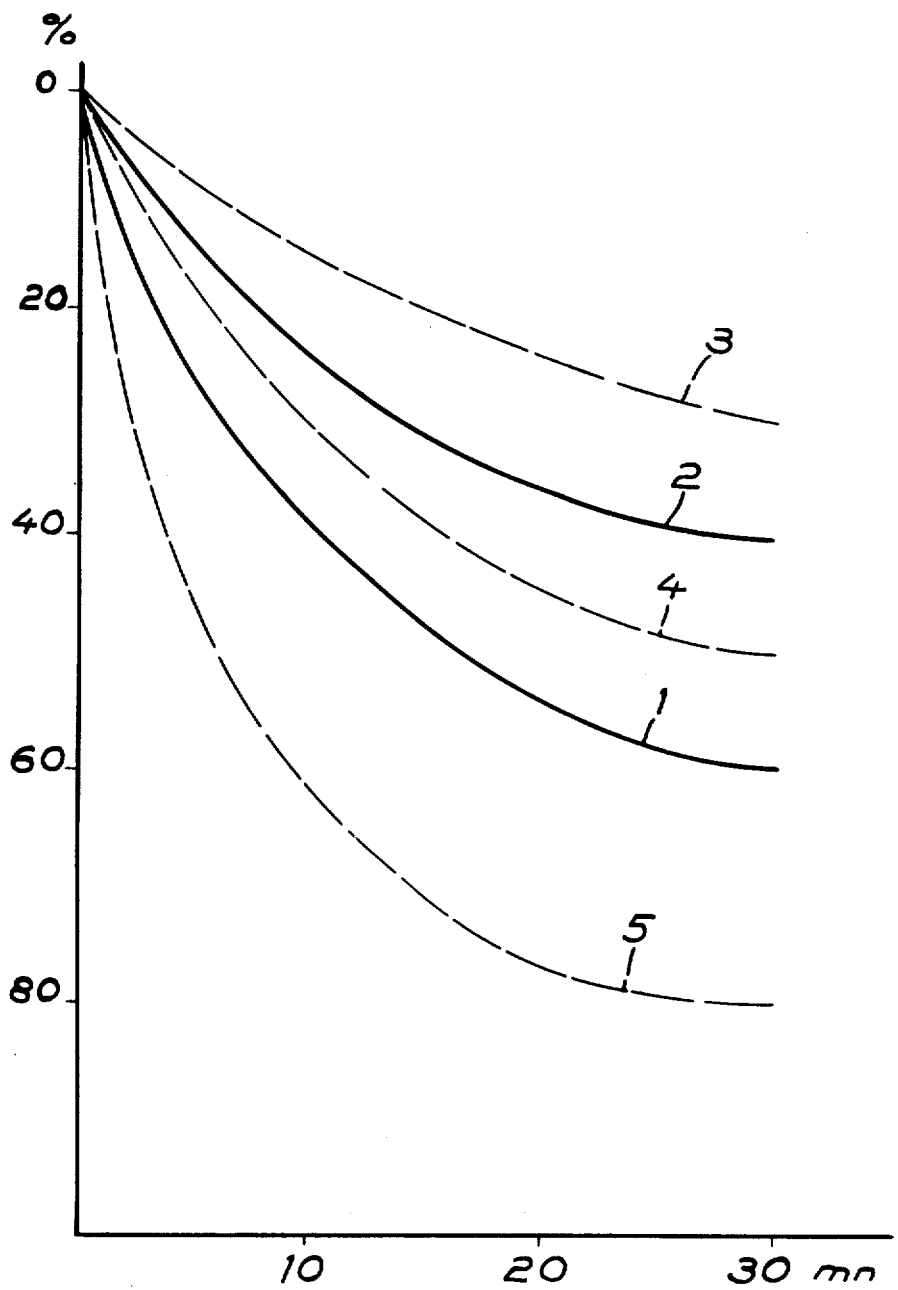

ENZYMATIC PRODUCTS WHICH OPTIMIZE THE VISCOSITY OF MUCUSES AND THEIR APPLICATIONS

The present invention relates to new proteolytic enzymatic products which possess the fundamental property of being able to bring about, in vivo, optimization of the viscosity of mucuses, especially of the intestinal mucus, of the bronchial mucus and of the cervical mucus. It also relates to the preparation, and to the foodstuff, veterinary, dietetic and pharmaceutical applications.

The constant development of intensive animal breeding in industrilized countries and the severe shortage of animal proteins in the developing countries more and more make it necessary to carry out studies aimed at increasing the rate of growth of animals and reducing their consumption index.

Recently, the effect of adding various ordinary enzymes (proteolytic, lipolytic or amylolytic enzymes), capable of facilitating the digestion of the principal constituents of these foodstuffs (proteins, lipids, and carbohydrates) to compound feedstuffs for animals has been studied. It would generally have been assumed that these exogenic enzymes, when supplementing endogenic enzymes, would facilitate the in vivo digestion, and as a result increase the rate of growth of the animals. None of these studies have hitherto led to results of practical value; the slight and varying improvement in the speed of growth and in the consumption index which has sometimes been observed has finally shown itself to be too low and irregular in relation to the price of the enzymes added.

The present invention proposes to add enzymes which differ from ordinary enzymes by their ability to optimize the viscosity of the intestinal mucus and hence to increase the speed of absorption of digested foodstuffs and equally that of medicines taken orally.

The intestinal mucous membrane, which like all mucous membranes, is delicate, is protected against attack by the external medium by means of a layer of a viscous liquid, the intestinal mucus. The viscosity of this mucus is related to the presence of macromolecules of mucins and of mucopolysaccharides which, linked together by protein bridges, form a tight crosslinked structure.

The intestinal mucus thus forms a sort of protective barrier between the mucous membrane and the bolus of food which is being digested. This barrier prevents the intestinal wall from coming into too close contact with the large molecules of endogenic enzymes (trypsin and chymotrypsin) which cause the digestion of the foodstuffs but can finish by attacking the mucous membrane itself. On the other hand this barrier must allow small molecules of digested foodstuffs to filter rapidly, these small molecules having to pass this intestinal wall in order to join the bloodstream.

If it is excessively viscous, the intestinal mucus runs the danger of restricting the passage of the digested foodstuffs into the blood; if it is insufficiently viscous, it runs the danger of losing its normal role of protecting the mucous membrane.

This invention is based on the following two surprising discoveries:

A. It is possible to manufacture industrially, by fermentation, proteolytic enzymes which are able in vivo to impart the optimum viscosity in question to the intestinal mucus. When administered orally, that is to say in practice added to the foodstuffs and/or the drinking water, these enzymes cause a controlled and reversible reduction in the viscosity of the intestinal mucus and as a result a selective increase in the speed of absorption of the digested foodstuffs, as also of the medicines administered orally at the same time, or immediately after, these enzymes.

The ordinary proteolytic enzymes which have already been tried unsuccessfully in animal feeding against this have either an inadequate or excessive effect on the viscosity of the intestinal mucus. In the first case, the speed of absorption across the intestinal wall remains unchanged. In the second case, the excessive effect of the enzyme, like, indeed, any other irritant action, causes an abrupt discharge of the contents of the mucus glands into the intestine, with accelerated reformation of the contents of these glands; this undesirable hypersecretion of mucus which is markedly apparent on simple examination with the naked eye of the intestinal wall of autopsied animals, is comparable with the undesirable hypersecretion of sebum caused by an excessively detergent shampoo.

The existence of proteolytic enzymes capable of optimizing the viscosity of the intestinal mucus, that is to say capable of markedly reducing this viscosity without risk of a reaction hypersecretion, was thus not a priori obvious.

B. This optimization of the viscosity of the mucus and consequently this increase in the speed of absorption of the digested food will result in an increase in the speed of growth of the animals and a lowering of their consumption index.

This latter consequence was not obvious either. In effect, in view of the length of the intestinal tract, the foodstuffs always finish by being completely absorbed, and experience has shown that normally only residues without significant foodstuff value remain in the faeces. However, this complete absorption is not a sufficient criterion of the optimum utilization of the foodstuffs. Undoubtedly it could be assumed that it would be desirable for the blood to contain all the factors of anabolic synthesis simultaneously and at a sufficient concentration, but only experience was able to confirm the following law, which was not a priori obvious: in order to maximize the speed of growth, it is preferable to achieve a maximum concentration of the digested foodstuffs in the blood for a relatively short time, rather than an average concentration for a longer time, even if in both cases the total amount of foodstuffs passed into the blood is the same.

The enzymatic products according to the invention which are able in vivo to cause adequate optimization of the mucus are characterized firstly by comparing their effect in vitro on the intestinal mucus with the effects of two proteolytic enzymes having a natural optimizing effect: trypsin and chymotrypsin, the said comparison being carried out in accordance with the controlled viscosity reduction test (RMV test), and are characterized on the other hand by their insensitivity towards trypsin inhibitors, this latter condition ensuring an in vivo effect.

More precisely, the reduction in the viscosity of the intestinal mucus by the said enzymatic products must be within about ± 5 percent, relative to the viscosity of the said untreated mucus, of the values of the reduction in viscosity due to trypsin and to chymotrypsin, that is to say respectively between 60 + 5 = 65 percent and 40 − 5 = 35 percent relative to the viscosity of the said untreated mucus, under the conditions defined later.

According to a characteristic of the invention, the in vitro reduction of the viscosity of the intestinal mucus due to the said enzymatic products is exactly between those due to trypsin and to chymotrypsin, that is from 60 to 40 percent.

The process according to the invention which comprises fermentation of micro-organisms which produce proteolytic enzymes is also based on the RMV test, the fermentation being stopped when the enzymatic substances elaborated give a percentage reduction, relative to the viscosity of the said untreated mucus, of the said viscosity equal at least between that due to chymotrypsin reduced by 5 percent, and at most that of trypsin increased by 5 percent. the percentages being in all cases evaluated relative to the viscosity of the said untreated mucus. The said process also comprises the necessary treatments for purifying the products obtained when the latter have proved insensitive to trypsin inhibitors.

The producing micro-organisms are selected from among those which yield enzymatic products which meet the following two conditions: a positive RMV test, an insensitivity to trypsin inhibitors. Amongst the suitable micro-organisms, the inventor has been more particularly interested in fungi of the genus Streptomyces and of the species fradiae. This fact is not to be considered as imposing a limitation because of the large number of micro-organisms which can be suitable.

DESCRIPTION OF THE RMV TEST.

a. Preparation of the Enzymatic Product to be Studied.

A micro-organism which produces mixtures of proteolytic enzymes in significant amounts is fermented in accordance with the conventional techniques. At the end of the fermentation, the medium is filtered, concentrated, lyophilized or atomized: a crude enzymatic product is thus obtained; alternatively and preferably, after filtering and concentrating, the product is obtained by precipitation with ammonium sulphate and dried in vacuo, a partially purified enzymatic product is thus obtained which according to the conventional Ansom technique must contain at least 1,000 units per mg.

One Ansom unit (or, for brevity, A.U.) is here defined as being the amount of enzyme which when incubated for 10 minutes at 25° C. and at pH 7.5 in the presence of denatured haemoglobin, liberates from this substrate the equivalent of 1 $\mu$.g. of tyrosin, as determined by photometric absorption at 280 m.$\mu$. on the filtrate which cannot be precipitated with trichloracetic acid.

b. Measurement.

Calf mucus or pig mucus is used as the substrate immediately after slaughtering the animal after dieting for 24 hours, three successive sections of intestine, each of about 1 meter, are taken, starting from the stomach. One end is ligatured and the surface mucus is made to issue from the other end by applying slight pressure and is removed; thereafter, the deep mucus is collected by strong pressure or by scraping the internal wall of the intestine which has beforehand been split open, and the soluble phase of the mucus is separated therefrom by washing with 3 volumes of water followed by centrifugation. On average, 50 ml. of insoluble mucus is collected per animal; this mucus can be stored for several days at −20° C. or used immediately for viscosimetric studies.

The Brookfield cone-plate microviscometer, which makes it possible to work on 1g. of insoluble mucus, is used for these studies. The angular speed of the moving cone is generally adjusted to 12 rpm and the temperature to 37° C. A scale graduated from 0 to 100 makes it possible to determine the relative viscosity by direct reading. The index is adjusted to 100 with the mucus alone and 0.1 ml. of a solution buffered to pH 7.5 and containing the enzymatic product to be studied is then added. If this product is active, the viscosity drops rapidly and the curve of the drop in viscosity can be recorded as a function of the time. The reference enzymes trypsin and chymotrypsin are preferably used in a highly purified form, respectively containing 16,000 and 20,000 A.U./mg. They cause a reduction in viscosity of the mucus which reaches a plateau in less than 30 minutes so that the duration of a test can be fixed at 30 minutes. For a concentration of 50 A.U. per gram of mucus, these enzymes cause a reduction in viscosity of 20 percent; for a concentration five times higher, namely 250 A.U. per g. of mucus, they cause a reduction in viscosity which is generally 60 and 40 percent respectively. The calf or pig mucus furthermore varies from one animal to the other so that these results can vary depending on the sample of mucus used; if results excessively far away from the preceding values are obtained, it is possible either to discard the sample of mucus or to treat it by fractional precipitation and resuspension, so as to return approximately to these values.

Using such a sample of mucus, the reduction in viscosity caused by 250 A.U. of the enzymatic product to be studied per 1 g. of mucus is determined. If this reduction is preferably between 40 and 60 percent and more generally between 35 and 65 percent. the enzymatic product is chosen as satisfying the RMV test and hence as being able to cause the desired optimization of the viscosity of the mucus.

The action of the enzymes on the mucus is illustrated by FIG. 1 which gives the percentage reduction as the ordinates as a function of the time (in minutes) as the abscissae. This figure groups together the curves obtained with trypsin (curve No. 1) and chymotrypsin (curve No. 2), with an enzyme which does not satisfy the RMV test through an insufficient effect (papain, curve No. 3), with an enzyme which exactly satisfied the RMV test (enzyme from *Streptomyces fradiae*, batch 2, curve No. 4), and finally with an enzyme which does not satisfy the RMV test through an excessive effect (enzyme from *Bacillus subtilis*, Curve No. 5). The results obtained by using these enzymes in animal feeding are furthermore described below (Example 1).

c. Mode of Action - Indirect Characterization.

If certain enzymatic products thus cause a controlled reduction in the viscosity of the mucus, this is infact because they have a controlled effect on the proteins which in the mucus form bridges between the macromolecules of mucins and of mucopolysaccharides. Such products degrade the proteins to the polypeptides stage without systematically going to the stage of the amino-acids.

This fact makes it possible indirectly to recognize the products which satisfy the RMV test: they are the products which degrade the proteins of the mucus and hence also certain other proteins, forming polypeptides of which the average size is comparable to that of the polypeptides obtained by the action of trypsin and of chymotrypsin on these same proteins.

The direct process and the indirect process of recognizing products which satisfy the RMV test give results which without being entirely identical are nevertheless largely concordant; it is thus possible to select these products by one or other of these processes.

Specificity of the RMV Test.

The selection by the RMV test is one of the two essential conditions which the enzymatic products which can be used according to the invention have to fulfill. The other of these conditions, as will be seen below (Example 1) is that these products should be practically insensitive to trypsin inhibitors.

The enzymatic products which satisfy the RMV test are already a small minority relative to the great majority of products which do not satisfy this test either through giving an insufficient effect or an excessive effect. The products which satisfy the RMV test and which are furthermore practically insensitive to trypsin inhibitors hence form an even smaller minority.

The preceding double condition can be described as characteristic. In effect, as will be seen below, for a particular example (Example 1) experience shows that the enzymatic products which fulfill this double condition have a favorable influence on the growth of the animals and more generally are really effective in the foodstuffs, veterinary, dietetic and pharmaceutical composition according to the invention. Conversely, as will be seen in the same example, the products which do not fulfill this double condition have an unfavorable zero or slight and inconstant effect on the growth of the animals; this effect is thus of the same order as that of the enzymatic products already proposed in animal feeding prior to the invention and which have not been able to achieve final market acceptance because of the results obtained being mediocre.

The great value of a selection of the enzymatic products by means of the preceding characteristic double condition is that it makes it possible practically, rapidly and efficiently to recognize the products which can be suitable for the desired objective, with an extremely high probability of success. This prior selection avoids long and costly experiments on large series of animals which have often been attempted but have hitherto only led to results which are inadequate for practical use.

In order to prepare enzymatic products in accordance with the invention two strains of *Streptomyces fradiae* (No. 1998 and No. 2019 of the collection of the National Museum of Natural History in Paris) were employed.

Using the conventional techniques of fermentation, one of these strains is cultured in an industrial production medium having the following composition in g./l. of medium: soya flour 30 g./l., glucose 30 g./l., dipotassium phosphate 0.8 g./l., calcium carbonate 10 g./l.; pH 7.0. The fermentation temperature is fixed at 28° C. and the aeration at 0.3 volume of sterile air per volume of medium and per minute.

Under these conditions, *Streptomyces fradiae*, does not produce antibiotics and instead produces at least 5 proteases and 2 peptidases. These various enzymes can only be detected by long analytical techniques which are impracticable in routine work and nevertheless it is necessary as far as possible to avoid the formation of certain of these enzymes and especially of the peptidases which in too high a concentration are distinctly undesirable. However the essential aspect is that the enzymatic mixture obtained should satisfy the RMV test, which can be rapidly carried out and can thus be adapted to industrial routine. In general, some of this enzymatic mixture does not satisfy the RMV test at the start of the fermentation through giving an inadequate effect, satisfied the RMV test in the middle of the fermentation and does not satisfy the RMV test at the end of the fermentation, through giving an excessive effect. Using the method described above, the fermentation is stopped when the effect of the resulting enzymatic mixture on the mucus beings to exceed that of chymotrypsin without yet reaching that of trypsin. This duration of fermentation can vary from one manufacture to the next as a function of minimal and practically uncontrolable variations of the fermentation conditions; however, this duration generally remains between 60 and 84 hours and the total strength of the fermented mixture is generally about 3,000 A.U./ml.

The following products are prepared from this fermented medium by the conventional extraction techniques, but applying the RMV test control throughout:

Product A: the filtered fermented medium is concentrated in vacuo; a crude liquid enzymatic product containing at least 50,000 A.U./ml. is obtained.

Product B: A crude solid enzymatic product containing at least 100 A.U./mg. is produced from Product A by atomizing.

Product C: A partially purified enzymatic product containing at least 1,000 A.U./mg. is obtained from Product A by saline precipitation (ammonium sulphate) and drying in vacuo.

Product D: A moderately purified enzymatic product containing at least 10,000 A.U./mg. and showing a relative electrophoretic monodispersion of the enzymatic activity is obtained from Product A by a series of precipitations with ammonium sulphate and solvents, especially acetone, followed by redissolving, and by drying of the final precipitate in vacuo.

Product E: The predominant enzyme is separated from Product D by electrophoresis in the liquid phase, or column chromatography, dialysis and lyophilization, in a highly purified form containing at least 50,000 A.U./mg. and showing an absolute electrophoretic monodispersion.

All these products by definition satisfy the RMV test. In order to be usable according to the invention they must additionally be practically insensitive to trypsin inhibitors, as will be seen below (example 1). Experience shows that this is indeed the case for the above products. Hence these products form a particular group of enzymatic products which can be used according to the invention. Furthermore, through in each case employing the RMV test, other particular groups of enzymatic products which can be used according to the invention can be obtained from other *Streptomyces* than the *fradiae*, or from micro-organisms belonging to other genera, especially the genus *Bacillus*.

The products, A, B or C defined above can be used for the preparation of foodstuff compositions for animals which can be formulated on the basis of the following examples:

A. Tests on Rats

EXAMPLE 1

Rats Receiving a McCollum Feed

The composition of this feed is as follows: 60 percent sugar, 12 percent wheat flour, 18 percent casein, 3 percent yeast, 3 percent lard, 4 percent McCollum salts.

White albino rats aged 3 weeks and weighing about 40 g. are divided into five male or five female rats per cage; they take the feed and the drinking water voluntarily; they are weighed individually twice weekly for 3 weeks; the average daily growth is then determined on groups of 10 animals (five males and five females).

The comparison group receives the McCollum Feed.

The experimental groups receive this same feed supplemented with enzymes either at a dose of 100 A.U./g. or at a dose of 1,000 A.U./g. Accepting the fact that a growing rat daily consumes 1/10 of its weight in food (representing 10 g. of food per day for a rat weighing 100 g.), these doses respectively correspond to 10,000 and 100,000 A.U. per kg. of live weight and per day.

The enzymes used are those of which the effect on the mucus is illustrated by FIG. 1. Apart from enzyme S.F. batch 2 (S.F. = *Streptomyces fradiae*), which causes a 50 percent reduction in viscosity of the mucus, enzymes S.F. batch 1 and S.F. batch 3 are used, which respectively cause 40 and 60 percent reduction in viscosity of the mucus. These three batches satisfy the RMV test in the broad sense because they cause a reduction in viscosity of between 35 and 65 percent, but only batch 2 satisfies the RMV test in the narrow sense which is normally preferred. These three batches correspond to Product C defined above and contain about 2,000 A.U./mg.

The results obtained are given in Table I.

TABLE I

Effect of the enzymes on the reduction in viscosity of the mucus (according to the R M V test) and on the growth of the rats.

| Nature of enzyme | Reduction in viscosity % | Without enzyme g/day | Growth of the rats. with 100 A.U. per g of food g/day | % | with 1,000 A.U. per g of food g/day | % |
|---|---|---|---|---|---|---|
|  | 0 | 2.85 |  |  |  |  |
| Papain | 30 |  | 2.85 | 100 | 2.85 | 100 |
| SF Batch 1 | 40 |  | 3.45 | 121 | 3.40 | 119 |
| SF Batch 2 | 50 |  | 4.15 | 145 | 4.05 | 142 |
| SF Batch 3 | 60 |  | 3.25 | 114 | 2.95 | 103 |
| B.S. | 80 |  | 3.00 | 105 | 2.40 | 84 |

SF : *Streptomyces fradiae* enzyme
B.S : *Bacillus subtilis* enzyme

The enzyme SF batch 2, of which the effect on the mucus is exactly between that of trypsin and of chymotrypsin (reduction in viscosity: 50 percent) causes an increase in the speed of growth of the rats of between 40 and 45 percent for the two doses used.

For enzyme SF batch 1, the effect of which on the mucus is comparable with that of chymotrypsin (reduction in viscosity: 40 percent), this increase is less but remains about 20 percent for the two doses used.

For enzyme SF batch 3, of which the effect on the mucus is comparable with that of trypsin (reduction in viscosity: 60 percent), this increase is still 14 percent at a low dose but becomes practically zero at a high dose.

Thus the batches of SF enzymes which satisfy the R M V test to different extents have a different favorable effect on the growth of the rats. Furthermore, if a SF is fermented without applying the process of manufacture according to the invention, batches of enzymes are generally obtained which do not satisfy the R M V test through giving an excessive effect, and which have a markedly unfavorable effect on the growth of the rats.

Papain, which does not satisfy the R M V test through giving an inadequate effect has no effect on the growth of the rats.

An enzyme of *Bacillus subtilis* which does not satisfy the R M V test through giving an excessive effect, shows a slight favorable effect on the growth of the rats at a low dose, but this effect is not constant; furthermore, it becomes markedly unfavorable at a high dose. On autopsy, the intestinal wall of the rats which have received this high dose shows signs obvious to the naked eye of a hyper-secretion of mucus which suffices to explain the observed retardation in growth.

Finally, trypsin and chymotrypsin cause a slight and inconstant increase in the speed of growth of the rats, which is always less than 10 percent. These pancreatic enzymes which, in vitro, have a comparable effect on the mucus to that of enzymes SF batches 1, 2 and 3, thus have a markedly lesser effect on the growth of the rats in vivo. This anomaly can be explained through the fact that trypsin and chymotrypsin in excess can, in vivo, be blocked by endogenic trypsin inhibitors such as the Kunitz pancreatic inhibitor; against this, the enzyme which predominates in batches 1, 2 and 3 obtained from Streptomyces fradiae is practically insensitive to this inhibitor, just as it is practically insensitive to the exogenic inhibitors such as soya inhibitor.

EXAMPLE II

Rats receiving a food rich in soya proteins.

This food, normally used for growing chickens, has the following composition: cornflour 60 percent, soya flour 33 percent, lard 3 percent, mineral and vitamin compound 4 percent. The experiment is carried out on groups of 10 male rats under the same general conditions as the preceding experiment.

The comparison group has an average growth of 5.25 g/day.

The experimental group 1 which receives the same food supplemented with enzyme SF, batch 2, at a dose of 1,000 A.U./g, (corresponding to about 100,000 A.U. per kg of live weight and per day) has the same average daily growth.

Experimental group 2, which receives the same food but receives a drinking water in which enzyme SF, batch 2, is dissolved at a dose of 500 A.U./ml (also corresponding to about 100,000 A.U. per kg of live weight and per day) has an average growth of 7.3 g/day, which thus gives an increase of 39 percent.

The lack of success observed for experimental group 1 is not due to the presence of the Northrop trypsin inhibitor in the soya, because this inhibitor had been destroyed by the heat treatment normally carried out by the supplier of this raw material. Rather, this lack of success is due to the fact that the enzyme appears to have a particular affinity for soya proteins which, when added to the food at high concentration, can capture the whole of the enzyme; hence this enzyme can no longer act on the proteins of the mucus, the viscosity of which will no longer be reduced. However, if the enzyme is added to the drinking water in place of being added to the food, this capture will in part be avoided, and hence the success obtained with the experimental group 2. It is thus generally preferable to add the enzyme to the drinking water; experience furthermore shows that the stability of the enzyme in solution is sufficient for this method of administration to be practicable in industrial breeding.

EXAMPLE III

Investigations on the isolated intestinal tract.

The purpose of these investigations is directly to demonstrate the increase in the speed of absorption of foodstuffs through the intestinal wall.

An operation is carried out on five rats which had been dieting for 24 hours, weighing about 150 g and anaesthetized with urethane. After opening the abdominal cavity, about 10 cm of ileum are isolated, each end being connected to the exterior by a probe; the ileum is washed and 0.4 ml of a solution of a casein hydrolysis product containing 2.5 mg of nitrogen are then introduced. The solution is left in place in the ileum for 10 minutes and is then collected, and a rinsing solution is introduced and also collected; the residual nitrogen in the solutions collected in this way is determined. The same experiment is repeated on the same rat but with the prior introduction of 0.05 ml of a solution containing 0.5 mg/ml of enzymes SF batch 2, representing about 50 A.U.

It is found that the percentage of nitrogen absorbed varies greatly from one animal to the other in the comparison tests without enzyme and that it is 5 percent on average; in the tests which constitute the experiment the percentage varies less and is much higher because it reaches an average of 17 percent.

This same technique can be used to study the speed of absorption of other foodstuffs and its possible increase under the influence of the enzyme. It is found that this increase is generally greater for proteins than for carbohydrates or lipids. The increase in the speed of growth due to the enzyme must thus take place to the benefit of the muscular tissues of the animal rather than the benefit of its reserve substances; it can thus be said that the growth of the animal is not only improved in amount but also in quality.

The same technique can also be used to study the speed of absorption of medicines, the passage of which across the intestinal wall may or may not furthermore be dependent on a specific carrier. It is found that this speed of absorption is generally increased by the enzyme but to varying extents depending on the medicines.

B. Experiments on chickens

EXAMPLE IV

Free-range chickens.

Male chickens of the Arbor-Acres strain are initially all bred together and receive the same initial food. At the age of 12 days they are divided into 4 groups of 25 of the same average weight (124 g) and the same standard deviation (3.28).

The comparison group 1 receives a food based on maize and soya with a low protein concentration (16 percent). At the end of the experiment, at the age of 58 days, that is to say after 46 days of the experiment, the average weight is 1,430 g and the consumption index (ratio of the weight of food consumed to the weight of the animals) is 2.30.

The experimental group 1 receives the same food supplemented by 4 g/kg of the product B defined above, containing 100 A.U./mg; the dose of enzyme is thus 400 A.U./kg of food, which corresponds to about 40,000 A.U./kg of live weight and per day. At the end of the experiment, the average weight is 1553 (+8 percent) and the consumption index is 2.15 (−7 percent).

The comparison group 2 receives a food based on maize and soya, having a normal concentration of proteins (22 percent). At the end of the experiment, the average weight is 1,676 g and the consumption index 2.09.

The experimental group 2 receives the same food also supplemented at a dose of 400 A.U. per kg of food. At the end of the experiment, the average weight is 1,772 g (+6 percent) and the consumption index is 1.98 (−5 percent).

EXAMPLE V

Battery-raised chickens.

The experiment relates to 2 batches of about 6,000 chickens of the Vauguard-Garrison strain, battery-raised. The comparison batch receives a commercial food based on soya and maize, in which analysis shows 21 percent of proteins and 5 percent of lipids, in the form of a flour; this food is guaranteed to contain 8 mg/kg of penicillin-procaine and 25 mg/kg of tetracyclin. The experimental batch receives the same food supplemented by 400 mg/kg of the product C defined above, containing 2,000 A.U./mg; the dose of enzyme is thus 800 A.U. per kg of food, which corresponds to about 80,000 A.U./kg of live weight and per day.

On the 30th day of the experiment, the chickens apparently show the same development in the two batches, but each chicken has on average consumed 1,080 g of food in the comparison batch and only 903 g in the experimental batch, resulting in an economy of about 16 percent in the food.

From the 40th day onwards, an epidemic develops in the whole of the brood, which the experimental batch resists much better.

At the end of the 60 days experiment, the mortalities are 5 percent for the comparison batch and only 1.6 percent for the experimental batch.

The average weights are 1,346 g and 1,319 g respectively. This slight difference in disfavor of the experimental batch is explained by the fact that in this batch the animals of weak constitution survived whilst they would probably have died in the absence of enzyme.

The consumption indices are 2.8 and 2.63 respectively, resulting in an economy of 6.5 percent in the food for the experimental batch.

A simple economic calculation shows that the benefits for 1,000 chickens are 64 F. and 266 F, respectively, not taking into account the price of the enzyme.

Control experiment: at the start of the main experiment, a group of 25 chickens is taken from each batch and raised on the floor in a separate building where the hygienic conditions are better. The mortality is nil for these groups. The average weights are 1,603 g for the comparison group and 1746 g(+9 percent) for the experimental group. The consumption indices are 2.68 and 2.41 (−10 percent) respectively.

EXAMPLE VI

Repetition of Example V.

However, Example V corresponds to an experiment carried out in midsummer during a heatwave from which the animals visibly suffered, whilst Example VI corresponds to an experiment carried out in autumn under more normal climatic conditions.

At the end of a 60 days' experiment, the mortalities are 7.9 percent for the comparison batch and 4.8 percent for the experimental batch.

The average weights are 1,338 g and 1,356 g respectively.

The consumption indices are 2.73 and 2.38 respectively, resulting in an economy of 12.4 percent in the food for the experimental batch.

A simple economic calculation shows that the benefits for 1,000 chickens are 77 F. and 469 F. respectively, not taking into account the price of the enzyme.

Comments.

These experiments on chickens were carried out before having suspected the risk of capture of the enzyme by the proteins of the soya, and before having remedied this by adding the enzyme to the drinking water as in Example II. Much better results, and in particular increases in the speed of growth comparable to those observed in Example II (+39 percent) can be obtained with chickens by adding the enzyme to the drinking water instead of adding it to the food.

C. Experiments on Calves

In this particular case, apart from its main action on the intestinal mucus, an enzymatic product, according to the invention, can also expect a not insignificant effect on the food itself. In effect, about ½ hour frequently elapses between the moment at which the milk reconstituted from milk powder is heated to 37° C and the moment at which it is consumed by the calves. This period is sufficiently long for the proteins of the milk to be partially degraded by the enzymatic product in a liquid medium at 37° C, which also, to a certain extent, contributes to the overall improvement in the growth of the calves.

Examples V and VI show that in breeding in an industrial farm the mortality is markedly lowered for the experimental batches, and this observation can be interpreted in different ways.

In particular, it is known that pathogenic microorganisms are sometimes abundant in the layer of the deep mucus and that the coccidiae or other parasites sometimes contribute to the formation of intestinal crypts where they become lodged; when these microorganisms, these coccidiae or these parasites are coated by an excessively viscous mucus, they can escape the effect of the antibiotics, the anti-coccidial agents or the anti-parasitary agents normally added in foodstuffs. The enzymes which can cause a controlled reduction in the viscosity of the intestinal mucus can thus have an activating effect on the antibiotics, the anticoccidial agents and the anti-parasitary agents; the reduction in mortality observed with the experimental batches can in part be explained in this way. The enzymatic products according to the invention can thus make it possible to reduce the dose of antibiotics, of anti-coccidial agents and of anti-parasitary agents normally added in compound foodstuffs for animals, without reduction in the protection provided by these three types of product.

On the other hand, the enzymatic products according to the invention make it possible to increase the speed of absorption through the intestinal wall of certain veterinary medicines as can be demonstrated by the technique described in Example III.

These products can hence be used for the preparation of various veterinary compositions.

The foodstuff compositions for the animals contain at least one of the products A, B or C combined with a physiologically tolerated excipient. They are administered at a dose of 1,000 to 20,000 A.U. per kg of body weight and per day. By excipient one understands either solids such as lactose or solvents, or coatings which protect the enzymatic products before they are used.

The veterinary compositions which act on the intestinal mucus so as to facilitate the absorption of the medicines contain at least one of the products A, B or C and are administered at a dose of 5,000 to 200,000 A.U./kg of body weight per day.

The most suitable form of administration in both cases is suitable oral administration.

The results described above relating to experiments carried out on animals can be extrapolated to human beings. To do so, and to achieve the desired effect with complete safety, a product which has been purified to an average extent, for example product D, will be taken in place of using a crude or partially purified enzymatic product. Dietetic and pharmaceutical specialities which act on the intestinal mucus will thus be produced. The dietetic compositions contain at least one of the products D or E and are administered at a dose of 1,000 to 20,000 A.U./kg of body weight and per day.

The pharmaceutical compositions which act on the intestinal mucus so as to improve the anabolism or increase the efficiency of medicines contain at least one of the products D or E, and are administered at a dose of 5,000 to 200,000 A.U. per kg of body weight and per day.

Like the intestinal mucus, the bronchial mucus in part owes its viscosity to the presence of macromolecules of mucins joined together by protein bridges. The principle of a controlled effect on the viscosity of the mucus by a controlled effect on the proteins of this mucus is thus equally applicable.

TABLE II

Doses to be administered daily and minimal content of the enzymatic product in accordance with its applications

| Minimal content of the enzymatic product | Doses to be administered daily | | | | | | |
|---|---|---|---|---|---|---|---|
| | Animals | | | Human beings | | | |
| | Therapeutic, point of action | | Feeding | Therapeutic, point of action | | | Dietetic |
| | Intestinal mucus | Bronchial mucus | Cervical mucus | | Intestinal mucus | Bronchial mucus | Cervical mucus | |
| 50,000 A.U./ml<br>100 A.U./mg<br>1,000 A.U./mg<br>10,000 A.U./mg | 5,000 to 200,000 A.U./kg of body weight | 500 to 50,000 A.U./kg of body weight | 500 to 50,000 A.U./kg of body weight | 1,000 to 20,000 A.U./kg of body weight | 5,000 to 200,000 A.U./kg of body weight | 500 to 50,000 A.U./kg of body weight | 500 to 50,000 A.U./kg of body weight | |
| 50,000 A.U./mg | | | | | | | | 1,000 to 20,000 A.U./kg of body weight |

For this reason, trypsin and chymotrypsin have already been proposed in bronchial therapy, but their use has proved to be limited for various reasons, and especially because of the existence of trypsin inhibitors, which are incidentally different from the Kunitz inhibitor, in the bronchial mucus.

Against this, experience shows that these inhibitors have no effect on the enzymatic products belonging to the particular group described above. These products in thus be used for a moderate reduction in the viscosity of the bronchial mucus, which will facilitate the explusion of the excess mucus and the action of antibiotics.

As the bronchial mucous membrane is more sensitive and less extensive than the intestinal mucous membrane, these products, which can be administered as an aerosol or in any other suitable administration form, will preferably be highly purified products such as product D for animals and products D or E for human beings, and will be used at relatively low doses, generally of between 500 and 50,000 A.U. per kg of body weight and per day.

Like the intestinal mucus, the cervical mucus in part owes its viscosity to macromolecules of particularly large size, linked together by protein bridges. The principle of a controlled effect on the viscosity of the mucus by a controlled effect on the proteins of this mucus is thus equally applicable The controlled effect on the viscosity of the cervical mucus appears distinctly desirable in the practice of artificial insemination of cattle, which is currently under active development. In fact, the degree of success at the first attempt is so far only 65 percent on average, which can in part be explained by the fact that an excessively viscous cervical mucus sometimes causes the formation of virtually a cervical plug which blocks the neck of the uterus and stops the travel of the spermatazoa.

Furthermore, it is now recognized that the success of an insemination is in part conditioned by the presence of a sufficient trypsin activity in the semen, which will ensure the activation of the spermatazoa. It is also known that the cervical mucus can contain certain trypsin inhibitors.

The enzymatic product belonging to the particular group defined above, which have an activity of the trypsin type, and are generally insensitive to trypsin inhibitors can thus cause a controlled reduction in the viscosity of the cervical mucus and contribute to the activation of the spermatazoa. They can thus facilitate the antibiotic treatment of illnesses which affect the genital tracts and can increase the degree of success at a first attempt both in artificial and n natural insemination.

Since the vaginal and uterine mucous membranes are more sensitive and less extensive than the intestinal mucous membrane, the enzymatic products which will serve for tHe preparation of the ovules will preferably be highly purified products, such as product D for animals and products D or E for human beings, and will be used at relatively low doses (generally between 500 and 50,000 A.U. per kg of weight and per day).

I claim:
1. A product for increasing the speed of absorption of foodstuffs and medicines orally ingested by animals by optimizing the viscosity of mucuses selected from the group consisting of the intestinal mucus, bronchial mucus and cervical mucus, said product consisting essentially of a proteolytic enzyme produced by culturing Streptomyces fradiae in a fermentation medium until said proteolytic enzyme has the following characteristics:

an aqueous solution containing 250 A.U. of said enzyme having a pH of 7.5 reduces the viscosity of 1 gram of intestinal mucus from 65 to 35 percent in 30 minutes, and the proteolytic enzyme is insensitive to trypsin inhibitors, said proteolytic enzyme being present in an amount sufficient to provide from 500 to 200,000 A.U. per kilogram of body weight per day, and a physiological acceptable carrier.

2. A method for increasing the speed of absorption of digested foodstuffs and medicines which comprises orally administering to an animal an amount sufficient to increase the speed of absorption of digested foodstuffs of a product consisting essentially of a proteolytic enzyme produced by culturing Streptomyces fradiae in a fermentation medium until said proteolytic enzyme has the following characteristics:

a. an aqueous solution containing 250 A.U. of a said enzyme and having a pH of 7.5 reduces the viscosity of 1 gram of intestinal mucus from 65 to 35 percent in 30 minutes; and b. the enzyme is insensitive to trypsin inhibitors, and a physiological acceptable carrier.

3. A method according to claim 2, in which the quantity of proteolytic enzyme product orally administered to an animal is from 500 to 200,000 A.U. per kilogram of body weight per day.

* * * * *